(12) United States Patent
Vennettilli et al.

(10) Patent No.: US 8,051,834 B2
(45) Date of Patent: Nov. 8, 2011

(54) METHOD FOR CONTROLLING THE EGR AND THE THROTTLE VALVES IN AN INTERNAL COMBUSTION ENGINE

(75) Inventors: Nando Vennettilli, Turin (IT); Massimiliano Maira, Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 323 days.

(21) Appl. No.: 12/465,921

(22) Filed: May 14, 2009
(Under 37 CFR 1.47)

(65) Prior Publication Data
US 2010/0175674 A1    Jul. 15, 2010

(30) Foreign Application Priority Data
May 14, 2008 (GB) .................................. 0808719.9

(51) Int. Cl.
*F02D 9/08* (2006.01)
*F02D 9/10* (2006.01)
(52) U.S. Cl. ...................................... 123/403; 123/399
(58) Field of Classification Search .................. 123/399, 123/403, 568.19, 564, 672, 703; 701/108, 701/109; 60/276, 605.1, 605.2
See application file for complete search history.

(56) References Cited

U.S. PATENT DOCUMENTS

| | | | |
|---|---|---|---|
| 5,474,051 A * | 12/1995 | Matsumoto et al. | 123/568.16 |
| 7,188,606 B2 * | 3/2007 | Ishikawa | 123/399 |
| 2004/0065303 A1 * | 4/2004 | Russell et al. | 123/480 |
| 2005/0193978 A1 * | 9/2005 | Ishikawa | 123/399 |
| 2008/0202118 A1 * | 8/2008 | Ide et al. | 60/605.2 |

FOREIGN PATENT DOCUMENTS

| | | |
|---|---|---|
| DE | 102004030258 A1 | 9/2005 |
| EP | 0843084 A2 | 5/1998 |
| EP | 1114924 A2 | 7/2001 |
| FR | 2849112 A1 | 6/2004 |
| GB | 2403165 A | 12/2004 |
| GB | 2423833 A | 9/2006 |
| JP | 9032651 A | 2/1997 |
| JP | 2000110627 A | 4/2000 |
| JP | 2005030339 A | 2/2005 |
| WO | 02073019 A2 | 9/2002 |

* cited by examiner

*Primary Examiner* — Mahmoud Gimie
(74) *Attorney, Agent, or Firm* — Ingrassia Fisher & Lorenz, P.C.

(57) ABSTRACT

A method and system are provided for controlling a throttle valve and an EGR valve in internal combustion engine. The method includes, the steps of measuring an actual fresh mass air flow value entering the engine, determining an exhaust oxygen concentration set point indicative of the oxygen concentration in the exhaust manifold, calculating an air reference value as a function of the exhaust oxygen concentration set point ($[O_2]_{spEM}$) and determining an oxygen concentration feedback value representative of the oxygen concentration in the engine. The method further includes, but is not limited to the steps of obtaining a position information for the throttle valve by comparing the actual fresh mass air flow value and air reference value and obtaining a position information for the EGR valve by comparing the oxygen concentration feedback value and oxygen concentration set point. The method also includes the steps of controlling the throttle valve and the EGR valve according to the position information.

12 Claims, 1 Drawing Sheet

METHOD FOR CONTROLLING THE EGR AND THE THROTTLE VALVES IN AN INTERNAL COMBUSTION ENGINE

CROSS-REFERENCE TO RELATED APPLICATION

This application claims priority to British Patent Application No. 0808719.9, filed May 14, 2008, which is incorporated herein by reference in its entirety.

TECHNICAL FIELD

The present invention relates to the control of a throttle valve and an EGR valve in an internal combustion engine.

BACKGROUND

The combustion process in an internal combustion engine produces $NO_X$ (principally NO and $NO_2$), CO, $CO_2$, HC (HydroCarbons), and PM (Particulate Matter).

The amount of $CO_2$ depends on the amount of fuel injected into the cylinders and the amount of CO and HC depends on the combustion efficiency of the internal combustion engine. The amount of $NO_X$ depends on the combustion temperature and on the amount of oxygen introduced into the cylinders, while the amount of PM is strictly dependent on the air to fuel ratio ($\lambda$).

To optimize the amount of PM and $NO_X$ produced, combustion engines are provided with an EGR (Exhaust Gas Recirculation) circuit. The EGR system recirculates exhaust gas from the exhaust manifold to the intake manifold in order to dilute the fresh air introduced into the engine. This leads to emission optimization during the combustion process, because higher amount of $H_2O$ and $CO_2$ are introduced, which have a high heat capacity that reduces the combustion temperature. Another effect of diluting the intake flow is that it is possible to control the amount of $O_2$ in the intake flow. The counter effect of this system is that the more the fresh air is diluted, the more the air to fuel ratio ($\lambda$) is reduced. This leads to higher amount of PM emissions.

The quantity of fresh air and exhaust gas flowing into the cylinders is controlled by the throttle valve and the EGR valve, respectively.

In conventional engines there is an electronic control unit (ECU) arranged to control the position of the EGR valve in closed loop (if the EGR valve may be controlled with a position feedback loop) and to control the air or the oxygen quantity in the intake manifold, the EGR rate, the $\lambda$, the oxygen quantity in the exhaust manifold, by acting either on the throttle valve or on the EGR valve.

The ECU is also arranged to control the temperature of the gas flowing through the EGR circuit in open loop (in case of presence of a cooler bypass in the EGR system) and to control the flap position of the charging system (in case of presence of a charging system that may be controlled with a position feedback loop).

Moreover, the ECU is arranged to control the pressure downstream the charging system, if present, by means of a boost pressure controller, using signals coming from a pressure sensor.

Known air control systems are provided with an air controller and a boost pressure controller, contained in the ECU, that make the engine operate using predetermined fresh air set point and boost set point set by the ECU.

The inputs of the air controller are the fresh air set point and an actual value of fresh mass air flow entering the engine, measured by an air mass sensor placed at the inlet of a turbocharger. The inputs of the boost pressure controller are the boost set point and an actual value of boost pressure in the intake manifold, measured by a sensor placed in the intake manifold downstream the mixing point between the fresh air flow and the recirculated gas flow. The output of the air controller is an actuation request both for the EGR and the throttle valve, which is sent respectively to two different position controllers which control the opening of the two valves.

The drawbacks of such architecture is that the control of the throttle valve and the EGR valve are based on a single air set point, and this leads to difficulties in controlling the emissions and coordinating the two valves.

In view of the above, it is at least one object of the present invention to provide an improved method for controlling the EGR valve and the throttle valve, which allows for control of each valve independently so as to obtain a better emission control. In addition, other objects, desirable features, and characteristics will become apparent from the subsequent detailed description of the invention and the appended claims, taken in conjunction with the accompanying drawings and this background.

SUMMARY

This and other objects are achieved according to the present invention by a method for controlling a throttle valve and an EGR valve in internal combustion engine. The method comprising the steps of measuring an actual fresh mass air flow value, determining an exhaust oxygen concentration set point indicative of the oxygen concentration in the exhaust manifold, calculating an air reference value as a function of the exhaust oxygen concentration set point, and determining an oxygen concentration feedback value representative of the oxygen concentration in the engine. The method further comprises the steps of obtaining a position information for the throttle valve by comparing the actual fresh mass air flow value the and air reference value, obtaining a position information for the EGR valve by comparing the oxygen concentration feedback value and oxygen concentration set point, and controlling the throttle valve and the EGR valve according to the respectively corresponding position information.

A control system, comprising a throttle valve and an EGR valve in an internal combustion engine that includes, but is not limited to a processor associated with the internal combustion engine and arranged to receive in a fresh mass air flow value entering the engine and to output an actuating signal for controlling a position of the EGR valve and the throttle valve. The processor adapted to measure an actual fresh mass air flow value, determine an exhaust oxygen concentration set point indicative of the oxygen concentration in the exhaust manifold, calculate an air reference value as a function of the exhaust oxygen concentration set point, and determine an oxygen concentration feedback value representative of the oxygen concentration in the engine. The processor is further adapted to obtain a position information for the throttle valve by comparing the actual fresh mass air flow value the and air reference value, obtain a position information for the EGR valve by comparing the oxygen concentration feedback value and oxygen concentration set point, and control the throttle valve and the EGR valve according to the respectively corresponding position information.

DETAILED DESCRIPTION

Figure 1:
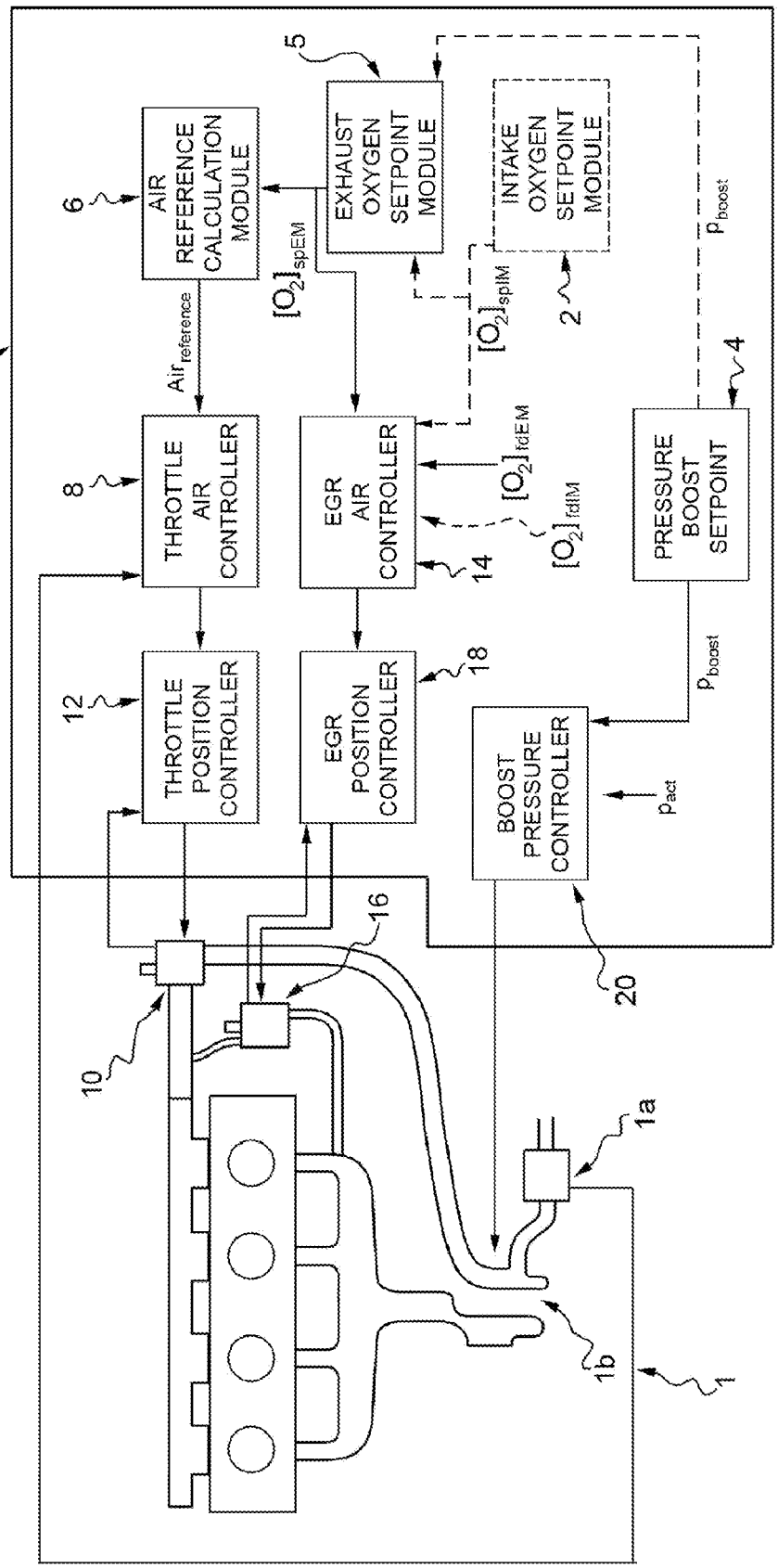
FIG. 1 shows a schematic picture of an internal combustion engine and a block diagram of an electronic control unit ECU arranged to control the EGR valve and throttle valve.

The following detailed description is merely exemplary in nature and is not intended to limit application and uses. Furthermore, there is no intention to be bound by any theory presented in the preceding summary and background or the following detailed description.

In FIG. 1, an actual fresh mass air flow value entering the engine is measured through an air mass sensor 1a placed proximate to a turbocharger 1b and represented by a signal 1. An intake oxygen concentration set point $[O_2]_{spIM}$ and a boost pressure set point $p_{boost}$ in the intake manifold are determined by the control unit ECU, through respective intake oxygen set point module 2 and boost pressure set point module 4, as a function of engine speed and the load. Alternatively, the intake oxygen concentration set point $[O_2]_{spIM}$ is not determined.

In a next air reference calculation module 6 an air reference value $Air_{reference}$ is calculated through the following equation:

$$Air_{reference} = \frac{\frac{[O_2]_{spEM}}{[O_2]_{air}} M_{fuel} + C_{sr} M_{fuel\_Burnt}}{1 + \left[\frac{[O_2]_{spEM}}{[O_2]_{air}}\right]} \quad (1)$$

Where $M_{fuel}$ is the quantity of injected fuel, $M_{fuel\_Burnt}$ is the portion of the injected fuel quantity that takes part to the combustion process, $C_{sr}$ is the stoichiometric air to fuel ratio, $[O_2]_{spEM}$ is an exhaust oxygen concentration set point in the exhaust manifold, determined by an exhaust oxygen set point module 5 within the control unit ECU as herein below disclosed, $[O_2]_{air}$ is the oxygen concentration in the fresh air (e.g., 20.95% in case of volumetric concentration).

The exhaust oxygen concentration set point $[O_2]_{spEM}$ is provided by module 5 according to the following two options: 1) it is determined as a function of the engine operating point (engine speed and load); and 2) it is calculated according to the following equation (if the intake oxygen concentration set point $[O_2]_{spIM}$ is determined):

$$[O_2]_{spEM} = \frac{\left(\eta \frac{p_{boost} V_{eng} N_{eng}}{R_{im} T_{im} 120}\right)[O_2]_{spIM} - C_{sr} M_{fuel\_Burnt}[O_2]_{air}}{\left(\eta \frac{p_{boost} V_{eng} N_{eng}}{R_{im} T_{im} 120}\right) + M_{fuel}} \quad (2)$$

Where $\eta$ is the volumetric efficiency, $V_{eng}$ is the engine displacement, $N_{eng}$ is the engine rotational speed, $R_{im}$ is the ideal gas law constant, $T_{im}$ is an intake manifold temperature set point.

Alternatively, the boost pressure set point $p_{boost}$ and the intake manifold temperature set point $T_{im}$ may be replaced with respective actual pressure and actual temperature measured by sensors placed in the intake manifold. Alternatively, other combinations of the above cited parameters may be possible.

Briefly summarizing, according to an embodiment of the invention, two options are therefore possible: 1) the exhaust oxygen concentration set point $[O_2]_{spEM}$ is determined within the control unit ECU and it is then used to calculate the air reference value $Air_{reference}$ through equation 1; and 2) the intake oxygen concentration set point $[O_2]_{spIM}$ is determined within the control unit ECU and it is used to calculate a corresponding exhaust oxygen concentration set point through equation 2, so as to have a value that can be used in equation 1 to calculate the air reference value $Air_{reference}$.

The air reference value $Air_{reference}$ and the actual fresh mass air flow value as represented by signal 1 are then sent to a throttle air controller block 8 that compares the values and determines the closing or opening degree of a throttle valve 10 that must be set so as to have an actual fresh mass air flow value 1 equal to the air reference value $Air_{reference}$. The output of the throttle air controller block 8 is a position request sent to a throttle position controller 12 which controls the opening of the throttle valve 10.

The exhaust oxygen concentration set point $[O_2]_{spEM}$ or the intake oxygen concentration set point $[O_2]_{spIM}$ (if present) is sent towards an EGR air controller block 14, together with an oxygen concentration feedback value, measured by a sensor or estimated by the control unit ECU in a known manner. The oxygen concentration feedback value is an exhaust oxygen concentration feedback value $[O_2]_{fdEM}$ if the exhaust oxygen concentration set point $[O_2]_{spEM}$ is determined by the ECU, or it is an intake oxygen concentration feedback value $[O_2]_{fdIM}$ if the intake oxygen concentration set point $[O_2]_{spIM}$ is determined by the ECU.

The EGR air controller block 14 compares the set point and feedback values and determines the closing or opening degree of an EGR valve 16 that must be set so as to have an oxygen concentration feedback value equal to the corresponding set point. The output of the EGR air controller 14 is a position request sent to an EGR position controller 18 which control the opening of the EGR valve 16.

The boost pressure set point $p_{boost}$ is sent towards a boost pressure controller 20, together with an actual boost pressure value $p_{act}$ measured by a sensor placed in the intake manifold (not illustrated). The boost pressure controller 20 compares the values and outputs a control signal for operating the turbocharger 1b so as to have a pressure inside the intake manifold equal to the boost pressure set point $p_{boost}$. If there is no turbocharger, the boost controller is not used and in equation 1 the actual boost pressure value $p_{act}$ instead of the boost pressure set point $p_{boost}$ is used.

Through the above disclosed steps of the method, it is possible to control the EGR valve 16 and the throttle valve 10 through separate air controllers, each controller using different input set points. The different set points are nevertheless related to each other, in particular it is possible to determine set points for the throttle air controller 8 based on set points already existing for the EGR air controller 14 and the boost pressure controller 20. This allows to have coherent set points between all the controllers and to better control the engine emissions.

The embodiments of the invention are applicable in combustion engines equipped with a turbocharger and an EGR system. The EGR system may be with or without cooler or with cooler and cooler bypass. The EGR valve may be for example a pneumatic or a solenoid valve, and may be controlled with a position feedback loop or not. The same applies to the throttle valve.

Alternatively, the embodiments of the invention are applicable also to engines without turbocharger or any type of charging systems. Furthermore, the embodiments of the invention are applicable in both Diesel and gasoline engines.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method for controlling a throttle valve and an EGR valve in internal combustion engine, the method comprising the steps of:
   measuring a fresh mass air flow value entering the internal combustion engine;
   determining an exhaust oxygen concentration set point ($[O_2]_{spEM}$) indicative of an oxygen concentration in an exhaust manifold;
   calculating an air reference value ($Air_{reference}$) as a function of the exhaust oxygen concentration set point ($[O_2]_{spEM}$);
   determining an oxygen concentration feedback value ($[O_2]_{fdIM}$, $[O_2]_{fdEM}$) representative of an oxygen concentration in the internal combustion engine;
   obtaining a position information for the throttle valve by comparing the actual fresh mass air flow value and the air reference value ($Air_{reference}$);
   obtaining a position for the EGR valve by comparing the oxygen concentration feedback value ($[O_2]_{fdIM}$, $[O_2]_{fdEM}$) and the oxygen concentration set point ($[O_2]_{spEM}$); and
   controlling the throttle valve according to the position information for the throttle valve and the position information for the EGR valve.

2. The method according to claim 1, wherein the engine comprises an intake manifold and a turbocharger and the method further comprises the steps of:
   determining a boost pressure set point ($p_{boost}$) in the intake manifold;
   measuring an actual boost pressure value ($p_{act}$) in the intake manifold;
   comparing the boost pressure set point ($p_{boost}$) and actual boost pressure value ($p_{act}$); and
   controlling the pressure inside the intake manifold with the turbocharger according to the results of the comparing the boost pressure set point and the actual boot pressure value.

3. The method according to claim 1, wherein the oxygen concentration feedback value ($[O_2]_{fdIM}$, $[O_2]_{fdEM}$) is an exhaust oxygen concentration feedback value ($[O_2]_{fdEM}$) representative of the oxygen concentration in the exhaust manifold.

4. The method according to claim 2, wherein the step of determining an exhaust oxygen concentration set point ($[O_2]_{spEM}$) comprises the steps of:
   determining an intake oxygen concentration set point ($[O_2]_{spIM}$) indicative of the oxygen concentration in the intake manifold; and calculating an exhaust oxygen concentration set point ($[O_2]_{spEM}$) according to the following equation:

$$[O_2]_{spEM} = \frac{\left(\eta \frac{p_{boost} V_{eng} N_{eng}}{R_{im} T_{im} 120}\right)[O_2]_{spIM} - C_{sr} M_{fuel\_Burnt}[O_2]_{air}}{\left(\eta \frac{p_{boost} V_{eng} N_{eng}}{R_{im} T_{im} 120}\right) + M_{fuel}}$$

where $\eta$ is a predetermined volumetric efficiency of the engine, $V_{eng}$ is a predetermined engine displacement, $N_{eng}$ is the engine rotational speed, $R_{im}$ is the ideal gas law constant, $T_{im}$ is an intake manifold temperature set point.

5. The method according to claim 4, wherein said oxygen concentration feedback value ($[O_2]_{fdIM}$, $[O_2]_{fdEM}$) is an intake oxygen concentration feedback value ($[O_2]_{fdIM}$) representative of the oxygen concentration in the intake manifold.

6. The method according to claim 1, wherein the air reference value ($Air_{reference}$) is calculated according to the following equation:

$$Air_{reference} = \frac{\frac{[O_2]_{spEM}}{[O_2]_{air}} M_{fuel} + C_{sr} M_{fuel\_Burnt}}{1 + \left[\frac{[O_2]_{spEM}}{[O_2]_{air}}\right]}$$

where $M_{fuel}$ is the quantity of injected fuel, $M_{fuel\_Burnt}$ is a portion of the injected fuel quantity that takes part to the combustion process, $C_{sr}$ is the stoichiometric air to fuel ratio, $[O_2]_{air}$ is a predetermined reference oxygen concentration.

7. A system for controlling an internal combustion engine, comprising:
   a throttle valve;
   an EGR valve; and
   a processing associated with the internal combustion engine and adapted to receive a fresh mass air flow value entering the internal combustion engine and produce actuating signals for controlling a position of the EGR valve and a position of the throttle valve, the processing further adapted to:
   measure a fresh mass air flow value entering the internal combustion engine;
   determine an exhaust oxygen concentration set point ([O2]spEM) indicative of an oxygen concentration in an exhaust manifold;
   calculate an air reference value (Airreference) as a function of the exhaust oxygen concentration set point ([O2]spEM);
   determine an oxygen concentration feedback value ([O2]fdIM, [O2]fdEM) representative of an oxygen concentration in the internal combustion engine;
   obtain a position information for the throttle valve by comparing the actual fresh mass air flow value and the air reference value (Airreference);
   obtain a position for the EGR valve by comparing the oxygen concentration feedback value ([O2]fdIM, [O2]fdEM) and the oxygen concentration set point ([O2]spEM); and
   control the throttle valve according to the position information for the throttle valve and the position information for the EGR valve.

8. The system according to claim 7, wherein the internal combustion engine comprises an intake manifold and a turbocharger and the processor is further adapted to:

determine a boost pressure set point (pboost) in the intake manifold;

measure an actual boost pressure value (pact) in the intake manifold;

compare the boost pressure set point (pboost) and actual boost pressure value (pact); and control the pressure inside the intake manifold with the turbocharger according to the results of the comparing the boost pressure set point and the actual boot pressure value.

9. The system according to claim 7, wherein the oxygen concentration feedback value ([O2]fdIM, [O2]fdEM) is an exhaust oxygen concentration feedback value ([O2]fdEM) representative of the oxygen concentration in the exhaust manifold.

10. The system according to claim 8, wherein the processor determination of the exhaust oxygen concentration set point ([O2]spEM) comprises:

determining an intake oxygen concentration set point ([O2]spIM) indicative of the oxygen concentration in the intake manifold; and calculating an exhaust oxygen concentration set point ([O2]spEM) according to the following equation:

$$[O_2]_{spEM} = \frac{\left(\eta \frac{p_{boost} V_{eng} N_{eng}}{R_{im} T_{im} 120}\right)[O_2]_{spIM} - C_{sr} M_{fuel\_Burnt}[O_2]_{air}}{\left(\eta \frac{p_{boost} V_{eng} N_{eng}}{R_{im} T_{im} 120}\right) + M_{fuel}}$$

where $\eta$ is a predetermined volumetric efficiency of the engine, $V_{eng}$ is a predetermined engine displacement, $N_{eng}$ is the engine rotational speed, $R_{im}$ is the ideal gas law constant, $T_{im}$ is an intake manifold temperature set point.

11. The system according to claim 10, wherein the oxygen concentration feedback value ([O2]fdIM, [O2]fdEM) is an intake oxygen concentration feedback value ([O2]fdIM) representative of the oxygen concentration in the intake manifold.

12. The system according to claim 7, wherein the air reference value (Airreference) is calculated according to the following equation:

$$Air_{reference} = \frac{\frac{[O_2]_{spEM}}{[O_2]_{air}} M_{fuel} + C_{sr} M_{fuel\_Burnt}}{1 + \left[\frac{[O_2]_{spEM}}{[O_2]_{air}}\right]}$$

where $M_{fuel}$ is the quantity of injected fuel, $M_{fuel\_Burnt}$ is a portion of the injected fuel quantity that takes part to the combustion process, $C_{sr}$ is the stoichiometric air to fuel ratio, $[O_2]_{air}$ is a predetermined reference oxygen concentration.

* * * * *